Aug. 18, 1931.  J. VOLCKHAUSEN  1,819,852
VALVE INSIDE
Filed Jan. 7, 1925

INVENTOR
Julius Volckhausen,
By Attorneys,
Fraser, Myers & Manley

Patented Aug. 18, 1931

1,819,852

UNITED STATES PATENT OFFICE

JULIUS VOLCKHAUSEN, OF WEEHAWKEN, NEW JERSEY, ASSIGNOR TO A. SCHRADER'S SON, INC., OF BROOKLYN, NEW YORK, A CORPORATION OF NEW YORK

VALVE INSIDE

Application filed January 7, 1925. Serial No. 1,028.

This invention relates to valve insides for pneumatic tire valves or the like, and particularly to the valve pin and the valve cup or plunger thereof, and aims to provide certain improvements therein.

The primary object of the invention resides in reducing the manufacturing cost of such valve insides. Another object is to insure against possible leakage between the valve pin and valve cup. To this end I form the valve cup or plunger of sheet metal by a series of stamping or shaping operations, and then mount the resulting valve cup on the pin. Preferably the valve pin is formed with an enlargement over which a tubular portion on the valve cup seats, and the ends of the enlargement on the pin are upset to overlie the ends of the tubular portion to hold the valve cup upon the pin. This enlargement also provides a shoulder which cooperates with the valve cup to support the valve packing, which, in turn, serves to seal the joint between said parts. The invention also includes other features of novelty which will be hereinafter more fully described.

Referring to the drawings, wherein I have shown the preferred embodiment of my invention,—

Figure 1:
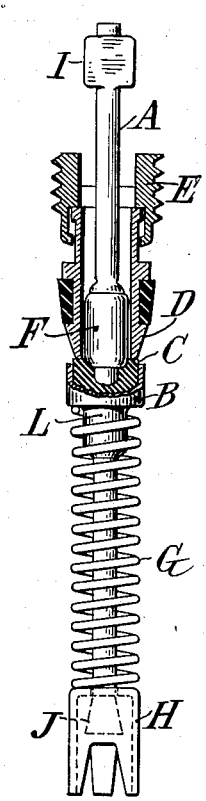
Figure 1 is an elevation of a valve insides, parts thereof being shown in section.

Referring to the drawings, the valve inside shown in Fig. 1 comprises a valve pin A upon which is mounted a valve cup or plunger B which carries a packing gasket C adapted to co-operate with a valve seat D. The valve seat herein shown is swiveled to an externally screw-threaded plug E by means of which the valve insides is held within a valve casing. Adjacent the valve cup or plunger there is mounted on the pin A a guide F which serves to prevent the canting of the valve, and also the withdrawal of the packing C from the cup B upon the unseating of the valve or upon deflation of the tire. A spring G and a spring support or cup H are also mounted on the pin A, and in order to prevent removal of any of the valve parts from the pin, the opposite ends thereof are swaged as shown at I and J. The valve insides as thus described is substantially the conventional valve insides now in general use, which may be inserted and removed from a valve casing as a unit. In this type of valve insides the valve cup or plunger is at the present time formed of solid metal stock by a series of machining operations, and then mounted on the valve pin by force fitting it thereover and then swaging it to prevent further movement or the pin. Although this manner of manufacture has proven economical, I have found that the cost of manufacture can be still further reduced by forming the valve cup or plunger from sheet metal by a stamping or shaping operation, and mounting the resulting cup over the valve pin by automatic machinery.

Figure 2:
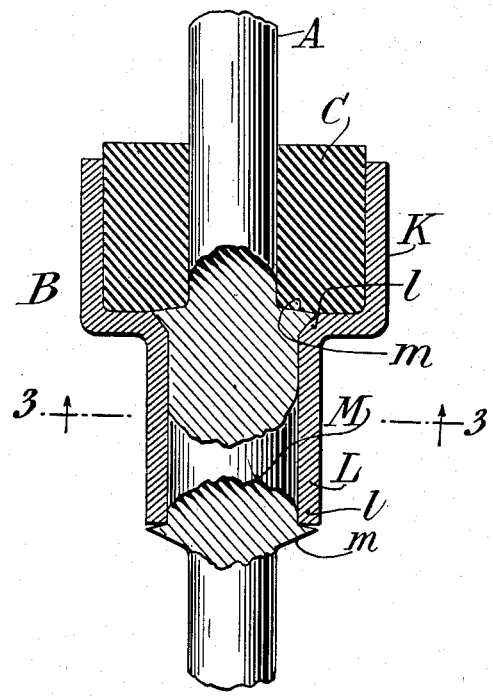
Fig. 2 is an elevation, partly in section, of the valve pin and plunger greatly enlarged.
Figure 3:
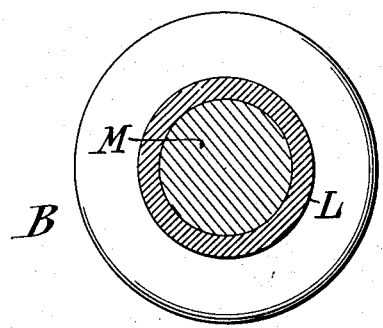
Fig. 3 is a section taken on the line 3—3 of Fig. 2.

According to the present invention I therefore make the valve cup or plunger B of sheet metal, and form it with a cup-shaped portion K adapted to receive the valve packing, and a tubular portion L adapted to engage over the valve pin. Preferably the valve pin is formed with an enlargement M intermediate its ends, formed by swaging or pressing up a part of the valve pin to increase its normal diameter and it is over this enlargement that the tubular portion L of the plunger seats. To prevent separation of relative movement between the plunger and pin, the ends $m$ of the enlargement M are swaged or pressed outwardly over the ends $l$ of the valve pin, as best shown in Fig. 2. This construction provides a joint between the valve pin and cup, which is laterally spaced from the normal surface of the valve pin, and preferably so formed that the top face of the enlargement which provides a shoulder on the pin will lie substantially flush with the pack-supporting face of the cup. The packing C, it will be understood, will seat on said shoulder and seating face to seal the joint between said pin and cup and thereby insure against any possible leakage of air therethrough. It will be obvious, however, that other means of engagement or interengagement between the valve pin and tubular portion of the plunger may be resorted to to prevent separation of said parts, and also to provide an air-tight joint therebetween. The assembling of these parts is to be carried out preferably by automatic machines of the four-slide type, in the operation of which two radial slides move inwardly to grip and hold the tubular portion L on the enlargement M, while two axial slides operate to swage down the ends $m$ of the enlargement over the ends $l$ of the tubular portion. The specific type of machine is to be employed for this operation is not herein disclosed, since it will constitute the subject-matter of a separate application, it being equally obvious that the assembling operation may be performed in other ways than this.

While I have shown and described a preferred embodiment of the invention, it will be understood that modifications thereof may be resorted to without departing from the spirit of the invention.

What I claim is:—

1. A valve insides for pneumatic tire valves or the like, comprising a valve pin having a shoulder intermediate its ends and a sheet metal valve packing support on said pin having a tubular portion and a cup-shaped portion, the shoulder on the pin overlying the tubular portion and facing in the same direction as, and being substantially flush with the base of the cup-shaped portion.

2. A valve insides for pneumatic tire valves or the like, comprising a valve pin having an enlargement, a sheet metal valve packing support mounted on said pin over said enlargement, said support having a tubular portion and a cup-shaped portion and said support and the enlargement having parts of the one swaged over the other to prevent separation of the members.

In witness whereof, I have hereunto signed my name.

JULIUS VOLCKHAUSEN.